Figure 1:
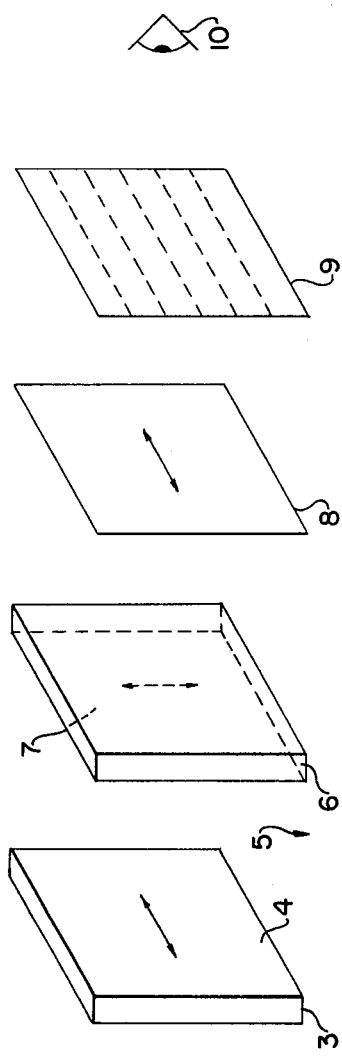
Figure 1:
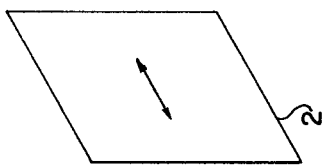
Figure 1:
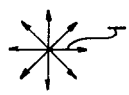

United States Patent
Cartmell et al.

[15] 3,700,306
[45] Oct. 24, 1972

[54] ELECTRO-OPTIC SHUTTER HAVING A THIN GLASS OR SILICON OXIDE LAYER BETWEEN THE ELECTRODES AND THE LIQUID CRYSTAL

[72] Inventors: James V. Cartmell; Donald Churchill, both of Dayton; Donald E. Koopman, West Carrollton, all of Ohio

[73] Assignee: The National Cash Register Company, Dayton, Ohio

[22] Filed: Sept. 22, 1971

[21] Appl. No.: 182,819

[52] U.S. Cl. .............................. 350/150, 350/160 LC
[51] Int. Cl. ................................................ G02f 1/16
[58] Field of Search ..................... 350/150, 160 LC

[56] References Cited

UNITED STATES PATENTS

| | | |
|---|---|---|
| 3,612,654 | 10/1971 | Klein et al. ............ 350/160 LC |
| 3,627,408 | 12/1971 | Fergason ......... 350/160 LC X |
| 3,652,148 | 3/1972 | Wysocki et al. ............ 350/150 |
| 3,666,948 | 5/1972 | Mechlowitz et al. ............ 350/160 LC X |

*Primary Examiner*—Ronald L. Wibert
*Assistant Examiner*—Edward S. Bauer
*Attorney*—E. Frank McKinney et al.

[57] ABSTRACT

An electro-optic shutter employing nematic liquid crystal material is disclosed. The electrodes of the shutter of this invention are protected with a thin overcoat of an insulating material such as glass. This thin overcoat essentially prevents rapid electrode failure due to conduction of current through the liquid crystal material.

12 Claims, 3 Drawing Figures

ELECTRO-OPTIC SHUTTER HAVING A THIN GLASS OR SILICON OXIDE LAYER BETWEEN THE ELECTRODES AND THE LIQUID CRYSTAL

This invention relates to a liquid crystal electro-optic shutter.

Electro-optic devices employing nematic liquid crystals are known in the art. These devices generally comprise glass plates with conductive planar electrodes on the interior surfaces, wherein at least one of the electrode planes is transparent. A thin layer of liquid crystal material is sandwiched between the glass plates. When the liquid crystal has a net positive dielectric anisotropy, the application of an electric potential across the cell electrodes causes the liquid crystal to be uniformly aligned with the molecular axes perpendicular to the cell surfaces. Often, a desired orientation of the liquid crystal in the quiescent or field-off state is obtained by rubbing the electrodes with a material such as a cotton swab prior to construction of the cell. In some applications, the optical contrast is enhanced by placing the cell between two linear polarizers oriented either parallel or perpendicular to the direction of rubbing. Such devices are described in U.S. Pat. No. 3,499,702 and in article by Messrs. M. Schadt and W. Helfrich in Applied Physics Letters, Volume 18, Number 4, pages 127 and 128 (1971).

A major problem with such electro-optical devices is rapid electrode failure due to electrolysis of the electrode material as a result of current conduction through the cell. One solution to this problem has been the employment of high purity liquid crystal material.

It now has been found that the electrodes can be protected with a thin overcoat of an insulating material such as sintered or fused glass, silicon oxide or the like. This thin overcoat removes the criticality of the purity of the liquid crystal material as current conduction is prevented even if the liquid crystal material is not pure.

Accordingly, an object of this invention is to provide an electro-optical device.

Other objects, aspects and advantages of this invention will be apparent to one skilled in the art from the following specification, the drawing and appended claims.

The liquid crystal materials employed in this invention are nematic liquid crystals. In particular, these liquid crystals are characterized by a positive dielectric anisotropy, that is, in an electric field they tend to align with the molecular axis parallel to the field direction. Compounds which exhibit this property are p-n-alkoxybenzilidene-p-aminoben-zonitriles, see U.S. Pat. No. 3,499,702. The property of positive dielectric anisotropy often is realized by mixtures of one or more of these or similar compounds with materials which do not normally exhibit positive dielectric anisotropy. Often, to obtain liquid crystal materials which are liquid through a desired temperature range, it is necessary to form mixtures of liquid crystals.

A thin sandwich cell is employed. The cell comprises two glass plates coated on the interior surfaces with a transparent conductive material. Indium oxide electrodes are most often used. Other electrodes include tin oxide, gold and the like. The electrode patterns are etched by conventional photoetch techniques using hydrochloric acid for dissolution of the indium oxide. Other suitable etchants are employed for different electrode material. The electrode pattern can be any desired configuration such as a 7-bar matrix, a 9-bar matrix, X-Y line pattern and the like.

After etching of the electrodes, the protective insulating overlay of the present invention is applied. One means for applying such a film is to vacuum evaporate silicon oxide on the surface containing the etched electrodes. Insulating films of 0.1 to 1.0 micron can be deposited in this manner. A thin layer enhances the electro-optic characteristics of the cell but the layer must not be so thick that complete isolation of the electrodes is obtained. Another technique for applying an insulating layer is to silk-screen a thin film of overlay on the surface and heat the plate in a kiln to form a glaze. This is preferably done with tin oxide electrodes because of their superior thermal characteristics.

The interior surfaces of the cell comprising the electrodes and the protective overlay are rubbed uniformly along one direction. When the plates are brought together to form the cell, they are positioned so that the rubbing directions are at right angles to each other. The finished cell contains a thin layer of nematic liquid crystal material between the plates. A typical example of this material is a mixture containing, by weight, 32 percent methoxybenzilidene-n-butylaniline, 58 percent ethoxybenzilidene-n-butylaniline and 10 percent p-n-butoxybenzilidene-p'-aminobenzonitrile.

Stroking the electrode's interior surface causes the molecular axis of the liquid crystal material to align in that direction. This can be done by rubbing the clean surface with a dry cloth such as a dense polishing cloth.

The liquid crystals align with their molecular axes parallel to the surfaces of the plates and along the rubbing direction with the field off and change their orientation to perpendicular to the plates (along the field direction) when the field is on. These effects are obtained with liquid crystals having a strong permanent dipole at one end of the molecule. A typical example is a mixture containing, by weight, 40 percent methoxybenzilidene-n-butylaminline (MBBA), 40 percent ethoxybenzilidene-n-butylaniline (EBBA), and 20 percent p-n-butoxybenzilidene-p'-aminobenzonitrile. Normally, these liquid crystals are liquid at room temperature.

Figure 2:
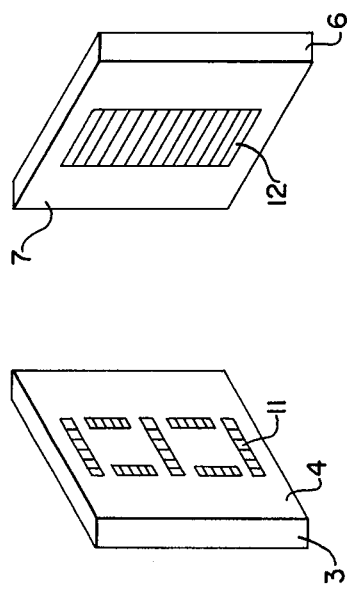

The electro-optic shutter of this invention is described in greater detail in connection with the accompanying drawing, in which:

FIG. 1 is a sectional view of the electro-optic shutter embodying this invention and FIG. 2 details the electrodes of this shutter.

In FIG. 1, light rays (not shown) pass from light source 1 through polarizer 2. Substrates 3 and 6 are aligned so that their adjacent faces 4 and 7 are parallel and spaced about 0.5 to 1.0 mil apart. Shims (not shown) can be used to maintain this spacing. Substrates 3 and 6 then are sealed (not shown). Prior to sealing, space 5 is filled with the desired liquid crystal materials. Light transmitted through substrates 3 and 6 then is transmitted through polarizer 8 and is seen on light scattering screen 9 by viewer 10.

In FIG. 2, electrodes 11 and 12 are shown. Note, electrode 11 is a 7-bar matrix and electrode 12 is a coating. Electric leads (not shown) are attached to the electrodes. It is these electrodes which are coated with the protective overlay of this invention.

Figure 3:
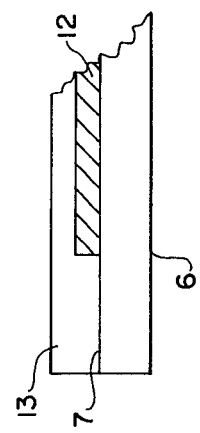

In FIG. 3, a side view of substrate 6 is shown with electrode 12 and face 7 coated with thin overcoat 13, i.e., the protective overlay of this invention.

A feature of the present invention is the cell construction. After the plates have been etched and rubbed, a thin ribbon of Ethylene Arcylic Acid copolymer is laid around the edge of the plates on the rubbed surface. The liquid crystal is placed between the plates and they are brought together with pressure and heat (to 100° C.) The copolymer wets the cell surfaces near the edges and effectively seals the cell.

Typically, light passing through the first polarizer is polarized in the horizontal plane (arrow). As it passes through the cell it is rotated 90° so that is emerges polarized in a vertical direction. If polarizer 2 is aligned to transmit light only in the horizontal plane, the light is extinguished and the observer sees no light. When the field is turned on, the cell does not affect the plane of polarization and the light emerges from the cell polarized in the horizontal direction, is transmitted by the second polarizer and the viewer sees light on the screen. A light image of the character in a dark background is observed. Alternately, the second polarizer may be rotated 90° and the field off mode will transmit light so that when the field is applied a dark image on a lighted background is observed. Contrast values of 30:1 are typically obtained.

In one case, the electrodes have been etched in a 7-bar configuration. An example is where these bars necessary to generate a figure four are activated. The figure then is viewed on the screen.

The scattering screen is used to improve the quality of the image. Also, since the effect is that of a shutter, the angle of view is very restricted and the screen acts as a diffuser. Without the screen, and with proper lenses, the system could be used as a dynamic projection image.

The device can be operated by application of a direct current potential across the cell but the insulating character of the leach requires a high potential. The preferred mode of operation is with a pulsed, unipolar D.C., bipolar D.C. or A.C. potential. The exact potential required is a function of the thickness and dielectrics constant of the insulating layer. Typical threshold voltages are 4 volts for 250 pulses per second unipolar D.C. and 2 volts for 60 Hz A.C. Since this is a field orientation the current is very low. The A.C. frequency can be varied from 20 Hz to several thousand Hz.

The switching time is about 10 milliseconds on and 40 milliseconds off.

Additional features of the insulating overlay are the optical uniformity of the cell when the overlay is present. Without the overlay, the liquid crystal electrode interface has an optical reflectivity different from that of the interface of the liquid crystal and the surrounding glass areas. Thus the electrodes are visible. With the overlay, the electrode areas are essentially indistinguishable from the surrounding surface. Also, the overlay protects the electrode areas during rubbing and a more vigorous rubbing procedure may be applied without electrode damage.

The advantages of this invention are further illustrated by the following examples. The materials and specific conditions are presented as being typical and should not be construed to limit the invention unduly.

EXAMPLE I

Two identical electro-optic shutters were operated according to this invention on a 10 volt pulsed 250 cycles per second, unipolar D.C. potential. A shutter such as described in FIGS. 1 and 2 was employed. Substrates 3 and 6 were 4 × 4 inches glass plates. Electrode 11 was etched as a 7-bar matrix and electrode 12 was etched panel. The electrodes were indium oxide. In one shutter, a thin, approximately 1 micron, overlay of vacuum deposited SiO was placed over the electrodes, while no overlay was employed in the second shutter. Employing a polishing cloth, the interior surface of substrate 3 was rubbed in a horizontal direction and the interior surface of substrate 6 was rubbed in a vertical direction. Space 5 of both shutters was filled with a mixture containing by weight 40 percent methoxybenzilidene-n-butylaniline (MBBA), 40 percent ethoxybenzilidene-n-butylaniline (EBBA) and 20 percent p-n-butoxybenzilidene-p'-aminobenzonitrile and then sealed. Cross-polarizers 2 and 8 were oriented in a horizontal direction.

In the shutter with no protective overlay, the electrodes failed after 20 hours of continuous operation. In the shutter with the SiO protective overlay, the electrodes showed no sign of failure after 2 months of continuous operation. Note, the only difference between the two shutters was the SiO overlay.

EXAMPLE II

A second cell was constructed using transparent tin oxide electrodes. A layer of Vita 1001 glass fritt was deposited over the electrode areas by a silk-screen technique. The plates were then heated to 615° C. to fuse the fritt to a clear layer of glass 1 mil thick. The surfaces were then rubbed and the nematic mixture of Example I was sealed in the cell. The lifetime and operating characteristics were similar to the cell of Example I having the protected electrodes.

Although this invention has been described in considerable detail, it must be understood that such detail is for the purposes of illustration only and that many variations and modifications can be made by one skilled in the art without departing from the scope and spirit thereof.

What is claimed is:

1. An electro-optic shutter comprising two spaced transparent plates;
    one face of each of the plates being coated with an electrically conductive film, wherein at least one film is transparent
    the two plates being spaced with the faces bearing the conductive films adjacent and from 0.5 to 1 mil apart;
    electrical conductive leads attached to the conductive films on the two plates;
    at least one nematic liquid crystal material filling the space between the two plates; and
    means for applying a voltage gradient between the leads, wherein the electrically conductive film is protected with a thin overcoat of sintered or fused glass or silicon oxide.

2. A shutter according to claim 1 wherein the thin overcoat has a thickness ranging from 0.1 to 1.0 micron.

3. A shutter according to claim 1 wherein the two spaced transparent plates are sandwiched between two linear polarizers.

4. A shutter according to claim 3 wherein the polarizers and film are oriented in parallel and perpendicular directions.

5. A shutter according to claim 1 wherein the nematic liquid crystal is characterized by a positive dielectric anisotropy.

6. A shutter according to claim 1 wherein the nematic liquid crystal is p-n-alkoxybenzilidene-p-aminobenzonitrile.

7. A shutter according to claim 1 wherein the nematic liquid crystal material is a mixture by weight of 40 percent methoxybenzilidene-n-butylaniline, 40 percent ethoxybenzilidene-n-butylaniline and 20 percent p-n-butoxybenzilidene-p'-aminobenzonitrile.

8. A shutter according to claim 1 wherein the electrically conductive film is indium oxide.

9. A shutter according to claim 1 wherein the voltage gradient is pulsed, unipolar D.C., bipolar D.C. or A.C. potential.

10. A shutter according to claim 1 wherein the voltage gradient is 4 volts for 250 pulses per second unipolar D.C. potential.

11. A shutter according to claim 1 wherein the two spaced transparent plates are glass.

12. A shutter according to claim 1 wherein the nematic liquid crystal material is a mixture by weight of 32 percent methoxybenzilidene-n-butylaniline, 58 percent ethoxybenilidene-n-butylaniline and 10 percent p-n-butoxy-benzilidene-p'-aminobenzonitrile.

* * * * *